United States Patent [19]
Smith

[11] 3,864,848
[45] Feb. 11, 1975

[54] LEARNER FEEDBACK DEVICE

[75] Inventor: Harry M. Smith, Battleground, Ind.

[73] Assignee: Purdue Research Foundation, Lafayette, Ind.

[22] Filed: Sept. 13, 1973

[21] Appl. No.: 397,019

[52] U.S. Cl. ............................................... 35/9 D
[51] Int. Cl. ............................................. G09b 5/02
[58] Field of Search ...................................... 35/9 D

[56] References Cited
UNITED STATES PATENTS

| | | | |
|---|---|---|---|
| 3,015,895 | 1/1962 | Stall | 35/9 D |
| 3,252,230 | 5/1966 | Donev | 35/9 D |
| 3,654,706 | 4/1972 | Perrella | 35/9 D |
| 3,659,356 | 5/1972 | Nelson | 35/9 D |

*Primary Examiner*—Wm. H. Grieb

[57] ABSTRACT

This invention relates to a learning feedback device which utilizes symbol bearing pieces, either singly or in combination, for emplacement on a display board. These devices have one or more magnets emplaced therein. The display board has single, or a plurality, reed type magnetically actuated switches emplaced there below in hidden position located such that a correct emplacement of one of said symbol bearing devices corresponding to an indicia displayed upon the display board will close an electric circuit by actuation of said magnetic switch thereby electrically energizing some type of signal device. There is no necessity to establish a conductive path between the symbol bearing devices emplaced on the display board and the magnetically actuated switching circuit hidden below the display board. The invention basically has two embodiments, one in which indicia bearing cards or plates are placed on the display board with variably located cutouts to receive the magnet bearing pieces, whereby different switches are actuated in the electrical circuit and the other embodiment has predetermined locations for emplacement of the magnet carrying pieces on the display board, with variable placement of the hidden magnetic switches causing variable, predetermined, correct energization of the switching circuit.

11 Claims, 8 Drawing Figures

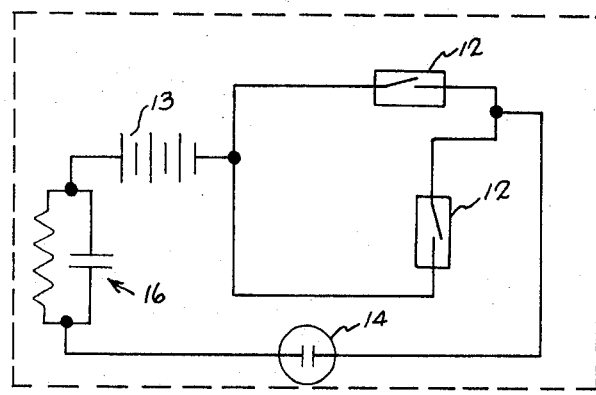
Fig. 1
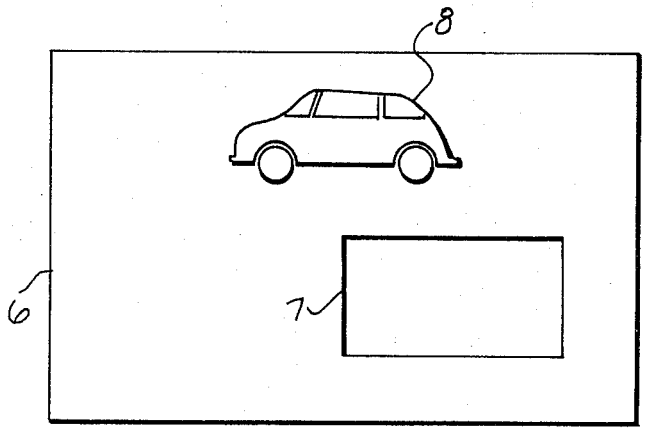
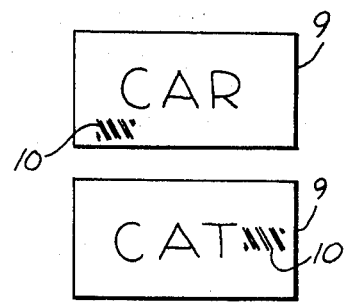
Fig. 2
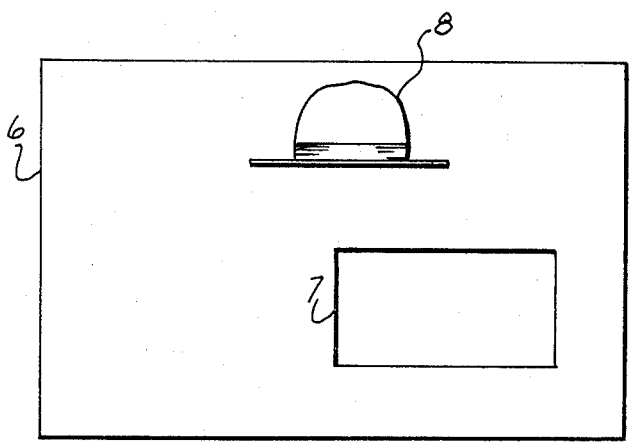
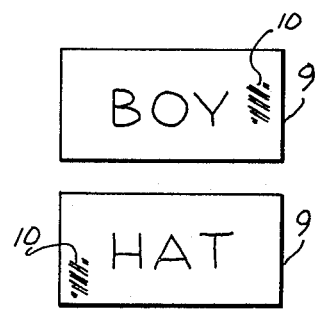
Fig. 3

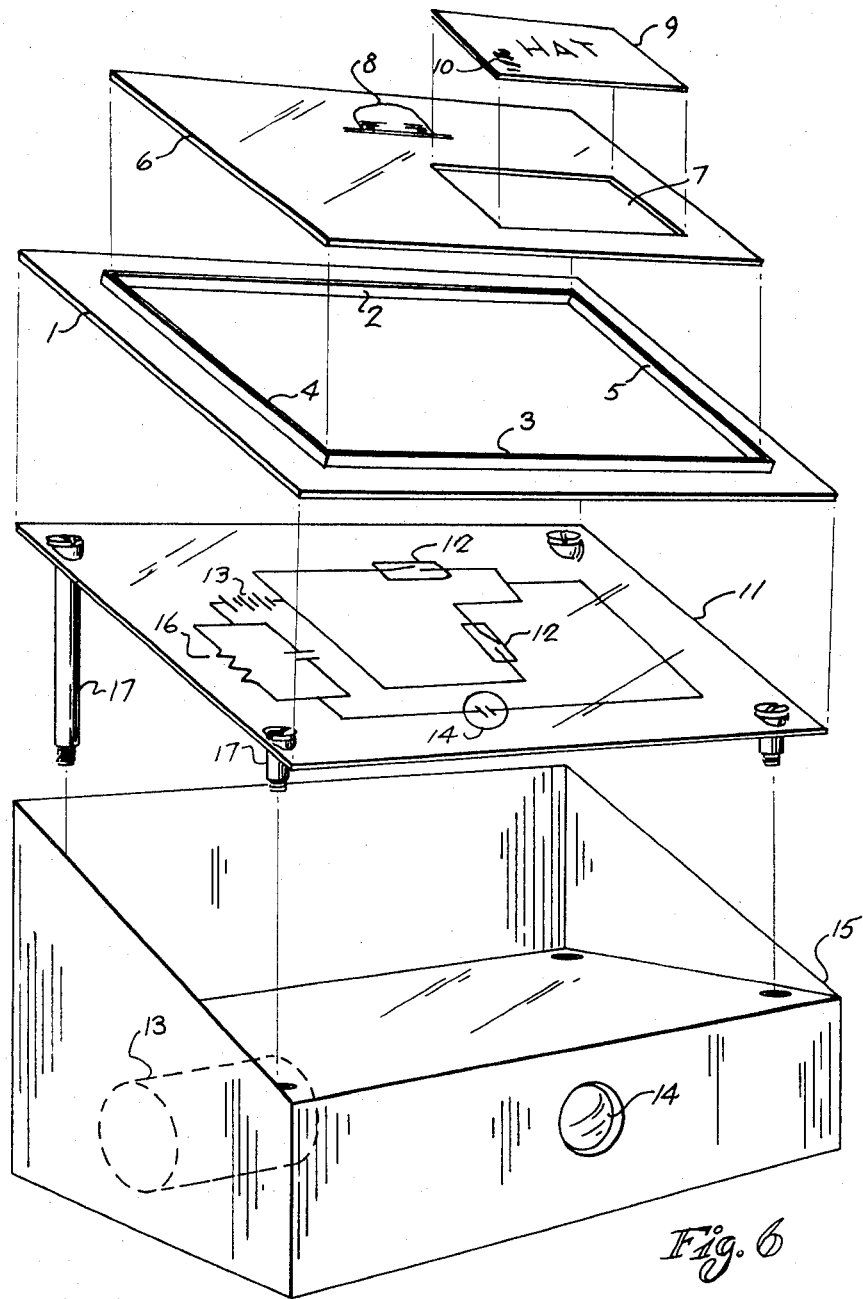

LEARNER FEEDBACK DEVICE

BACKGROUND OF THE INVENTION

Feedback devices for educational use are old, dating back to the purely mechanical self-instructional, test scoring mechanism invented by Pressey (1926) to the modern electronic computer based systems like those at the State University of New York (Adams, Morrison, and Reddy, (1968), the University of Illinois (Bidzer, (1966), and Florida Atlantic University (Estarellas, (1970), which have appeared since 1960.

There is a great difference between Pressey's initial "Drum Tutor" and today's sophisticated high-speed computers. In the intervening years many, many types of feedback devices have been tried and tested. They have included punch boards, self scoring chemo-cards, program text books, intricate simulators like those used in the training of pilots and astronauts, the so-called automatic testing-mechanisms designed to give a lecturer an immediate estimation of how well an audience has understood specific concepts included in his presentation, and even the record-playback language-laboratory. One principle remains the same throughout; no matter how simple or how complex the hardware, each has been designed to give the learner some knowledge of his efforts, immediately and in an efficient manner. Two recent patented feedback devices are exemplified in Perrella's U.S. Pat. No. 3,654,706 entitled "Educational Device", and Nelson's U.S. Pat. No. 3,659,356 entitled "Element Matching Device". The Perrella device is simply an improvement on the typical feedback type device which has long been embodied in games and other types of educational toys which permits the learner, by emplacing certain symbol bearing pieces on a circuit board, to close the circuit and thereby actuate some sort of success symbol. The Nelson device is somewhat more complicated, but basically the same, and calls for a symbol bearing piece, having a probe fixed thereupon which, when proper sequencing of a series of holes is aligned therewith, to force contacts together to close a predetermined circuit in a predetermined way.

Both of these devices have the fault that rough usage is likely to damage the contacting elements or the probe elements, and they have the further difficulty that anyone who programs this device for a large multiple of different solutions for different problems needs to be rather sophisticated in understanding the operation of the device. This is a difficulty common to other devices of the feedback nature which have fairly simple and inexpensive to construct configurations.

One object of the present invention is to provide a feedback learning device which may be preprogrammed in a simple manner.

Another object is to provide such a learning tool which will be rugged in construction and relatively foolproof in use so that wear will not cause false readings or cause failure of the device.

Other objects of the invention will be obvious and apparent from the following detailed description of the invention and the drawings.

SUMMARY OF THE INVENTION

The present invention basically consists of two separate types of embodiments.

One embodiment has its "logic" composed of a series of electronic circuits whose fundamental components are magnetic reed switches encapsulated in plastic which may be programmed in accordance with tasks the learner will undertake and in accordance with the basic structure of the subject matter. Programming this learner feedback device is accomplished by the juxtaposition and reorientation of the magnetic reed switches located inside the device and hidden from the view of the user. The other fundamental component of this type device is composed of one or more symbol bearing pieces, or display blocks. These blocks are given to the learner in random order, and are to be placed by him on a display board. Each individual display block contains a small bar magnet, the orientation of which is critical with regard to the funtion it will fulfill. Placed parallel to the magnetic reed switch in the corresponding logic block, a circuit is completed and a neon lamp is made to light or flash signifying to the learner that he has been successful in his task. Placed in any other position the circuit remains incomplete, since the reed magnetic switch is not actuated, and the light will not come on. The position of the magnetic switch within the logic block is critical. It is placed so as to avoid cross contamination from the magnetic field generated when erroneous display blocks are placed over an incorrect logic block.

The other type device embodied in the same inventive concept uses a non-magnetic piece of plastic, or fibre, cardboard, or other material, which is emplaced on the display board, and in which a "cutout" or a "window" has been precut. The symbol bearing pieces, or logic blocks as referred to above, again have one or more magnets mounted therein, but a "logic" of this device is now programmed primarily by the location of the cutouts on the indicia bearing cards. The magnetic reed switches are included in an electronic circuit hidden from the view of the user, as in the other embodiment of this device, but the programming of this device is much simpler and less expensive since it is done by using different indicia bearing "logic" plastic pieces which are changed right on the face of the device rather than by manipulating the internal circuitry of the device.

DESCRIPTION OF THE DRAWINGS

FIG. 1 is a circuit diagram of one embodiment of the device, wherein the "logic" is primarily programmed externally by means of a plastic indicia bearing card and symbol bearing block, both adapted for emplacement on the display board.

FIG. 2 is one type of plastic "logic" card showing typical symbol bearing blocks for use therewith.

FIG. 3 is another indicia bearing plastic card, showing additional symbol bearing blocks for use therewith.

FIG. 6 is an exploded perspective view of a display board, plastic indicia bearing card, symbol bearing block, and electrical components associated therewith.

DETAILED DESCRIPTION

Figure 5:
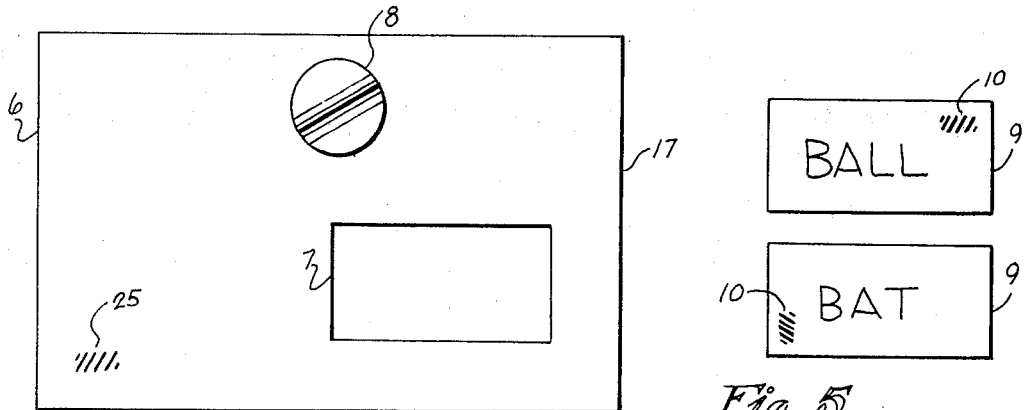
FIG. 5 is another type of indicia bearing card, adapted for use with the circuit depicted in FIG. 4, and showing symbol bearing blocks for use therewith.
Figure 7:
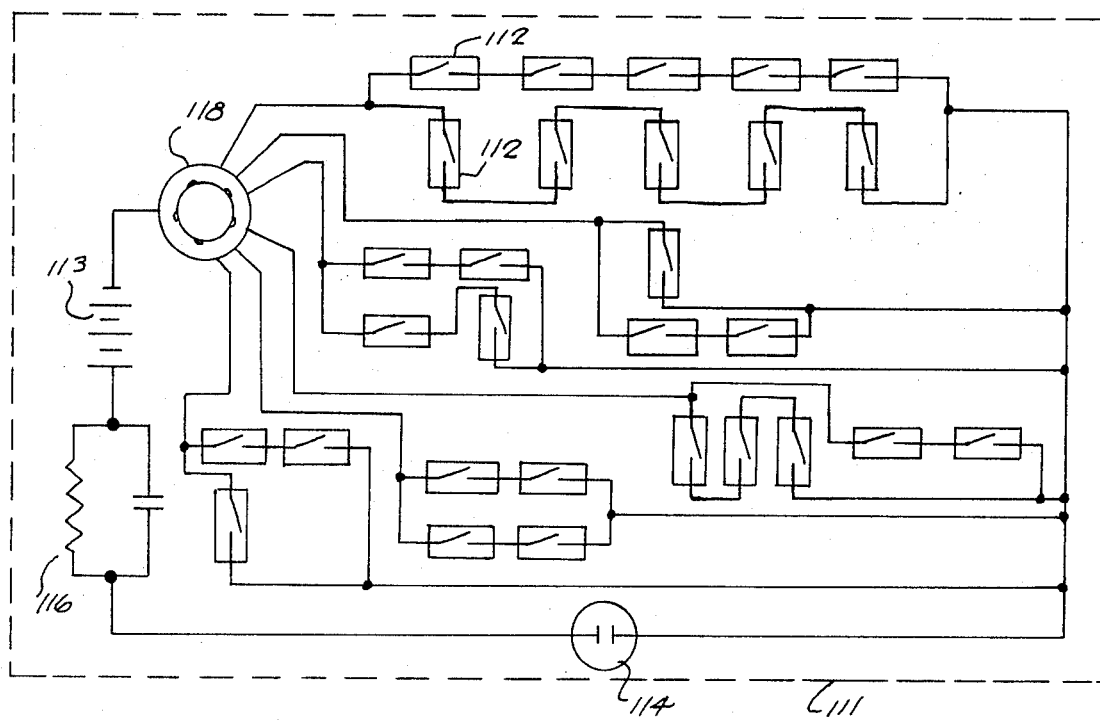
FIG. 7 is a circuit diagram of the other embodiment of the inventive device wherein the "logic" is programmed internally in the device, as well as externally according to the location of magnets in the symbol bearing block, as distinguished from the other embodiment wherein the logic is all externally programmed by virtue of the selection of the indicia bearing plastic card on the display board, in combination with the preselected magnet location in the symbol bearing blocks.
Figure 4:
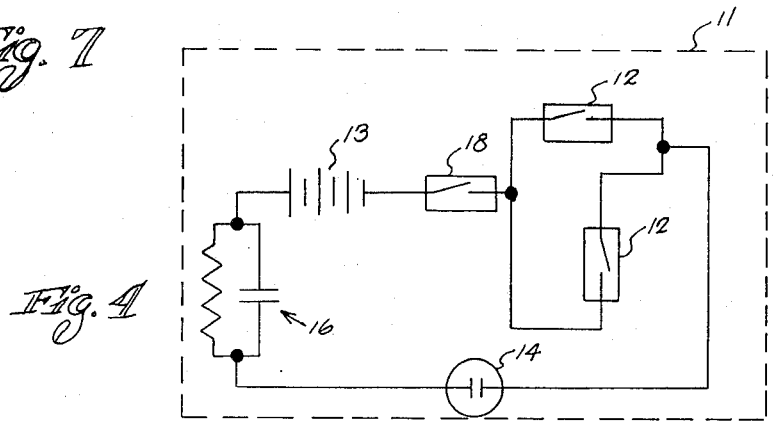
FIG. 4 is a circuit diagram of another embodiment of the device wherein the "logic" is primarily programmed externally by means of a plastic indicia bearing card and a symbol bearing block, both adapted for emplacement on the display board.

The preferred embodiment of the present invention is illustrated in FIGS. 1 through 6, and includes a display board 1 with horizontal guides 2 and 3 and vertical guides 4 and 5 sized to receive a "logic" indicia bearing card or plate 6 which has a cutout 7 therein. An indicia 8, as shown in FIG. 2 such as a "car" is imprinted on the card and then a symbol bearing block 9 which has the spelled out word "car" has a magnet 10 emplanted therein in a certain predetermined place. When novelty block 9 is emplaced in cutout or window 7 the electrical circuit board 11 which includes a magnetic reed switch 12, as shown in FIG. 1, will be in axial alignment with said magnet, and will actuate said magnetic reed switch whereby an electrical circuit is closed, which includes a battery 13 and low voltage lamp, such as a neon lamp 14 (preferably mounted on the front of mounting box 15), and the lamp will then be caused to attain a flickering condition, or a constant on condition, according to the type and variety of lamp selected. It is also preferable, although not essential, to include an R C filter circuit 16 in the circuitry mentioned. It will readily be observed that if the novelty block 9 indicated in FIG. 2, bearing the spelling "cat" should be inserted in the "logic" indicia bearing plate with the picture of the car thereupon, that there would not be coincidence with any magnetic reed switch since the location of the magnet is obviously different on the "cat" novelty block than on the "car" novelty block. It is a simple matter to locate the cutout on another "logic" plate at a slightly different position with an additional magnetic reed switch included below the surface of the display board and that electric circuit such that the two will coincide when the "cat" symbol block is located in axial actuatable position with respect to the other magnetic reed switch. Circuit board 11 is insulatively spaced from display board 1 and positioned within box 15 by a plurality of spacers 17.

This same principle is also illustrated by FIG. 3 in which the cutout or window is located in a different spot and two typical symbol blocks are shown, the block "boy" having a magnet in the wrong place and the block "hat" having a magnet in the proper place for actuation of the magnetic reed switch under which it will be juxtaposed when placed in the window cutout in the indicia bearing plate as shown in FIG. 3.

By varying the number and position of the magnetic reed switches placed below the display board, and the number and location of the magnets emplaced in the novelty blocks, a very large number of matching responses can be preprogrammed into this device according to the change in location and the cutout or window in the "logic" plastic plate. It has been experimentally determined, so far, that rotation of a reed switch by approximately 15 degrees will be sufficient not to cause it to be "contaminated" by a magnet juxtaposed at a 15 degree interval. It is believed that the sensitivity of the device may be varied according to the physical size of reed switches, and magnets employed and it is certain that, due to the undesirability of trying to manufacture such a device in a precision way, that an operable difference of 15 degrees is more than sufficient to justify all of the necessary variations in preprogrammed information to be used in this device.

Another species of the preferred embodiment described above is shown in FIGS. 4 and 5 and employs a magnet 25 embedded in the logic plate 17. A magnetic switch 18 is then connected in series (or it could also be in parallel but this is not shown) with switches 12 so that a "go" - "no-go" condition can also be preprogrammed into the device according to the logic plate selected.

Figure 8:
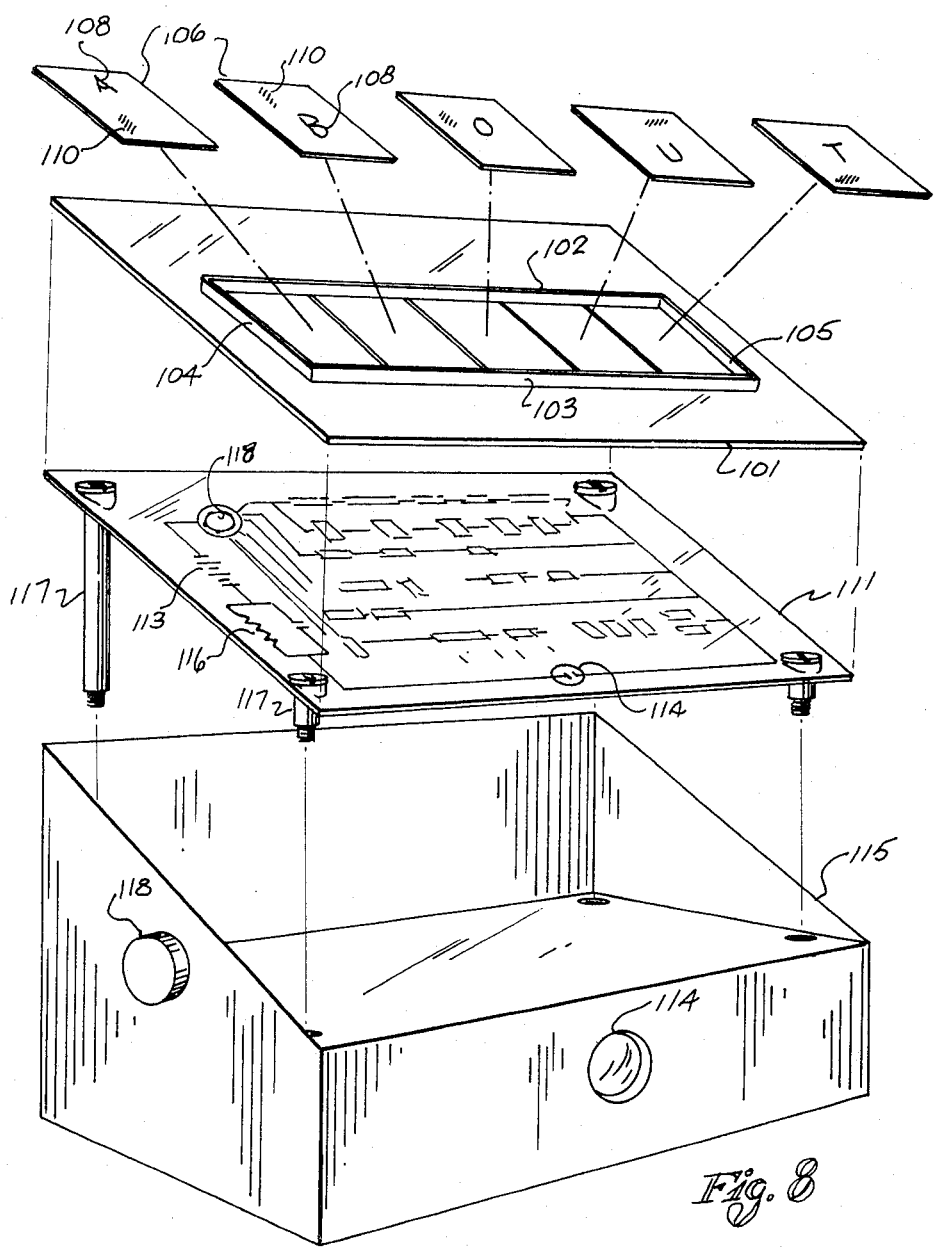
FIG. 8 is an exploded perspective view of the embodiment shown in FIG. 7.

The other embodiment of this device is somewhat more limited in that a group of magnetic reed switches 112 are prelocated below the display board 101 in hidden relationship to the symbol bearing blocks 106, but the location of the blocks will always be physically the same on the surface of the display board 101 so that different correct responses, and incorrect ones, can only be programmed into the device by varying the number and location of the magnets 110 in the novelty blocks and the location of the magnetic reed switches 112 below the surface of the display board 101. However, this type device is quite useful in preprogramming multiple numbers of symbol bearing blocks for sequential location on the surface of the display board as shown in FIG. 8, such that a group of magnetic switches 112, connected in series, are only actuated when certain correct sequential relationships are obtained by use of said symbol bearing blocks.

It is also possible to use parallel connections in said electric circuit such that still different correct and incorrect response closures of the circuit will be obtained according to different emplacements of the novelty blocks, a rotary switch 118 being provided for selection of circuitry to be energized.

Of course, only word and object associations have been shown in the drawings but other correct relationships, for example, in the second mentioned embodiment, 6 × 3 = 18 are easily attainable, as are other types of relationships between symbols, numbers and descriptive relationships of all kinds and conditions.

It is also readily apparent, that while a steady on light or a flashing light, are simply illustrated in this description as the signal to the learner that he has programmed a correct response, it may be readily appreciated that reward functions may be accomplished by the device, simply by means of a relay actuation, or other mechanical experience well known in the art.

What is claimed is:

1. A learning feedback device comprising
   a display board adapted to receive logic means and one or more symbol bearing means on the surface thereof;
   at least one symbol bearing means sized for emplacement on said display board, said symbol bearing means including at least one magnet;
   said logic means disposed in electrically noncontacting relationship with said symbol bearing means;
   electric circuit means influenced by said magnet to become electrically conductive while remaining electrically isolated from said symbol bearing means upon a predetermined correct emplacement of said symbol bearing means in relation to said logic means;

an electrically actuated signal device connected in said electrical circuit means;

and power supply means connected in said electrical circuit means and adapted to actuate said signal device upon said electrical circuit means becoming conductive.

2. A learning feedback device comprising:

a display board adapted to receive one or more symbol bearing means on the surface thereof;

at least one symbol bearing means sized for emplacement on said display board, said symbol bearing means including at least one magnet;

logic means comprised of non-magnetic material, said logic means bearing indicia thereupon having a predetermined correspondence with a symbol carried upon said symbol bearing means and said logic means being adapted to determine the place of emplacement of said symbol bearing means upon said display board;

electrical circuit means electrically isolated from said symbol bearing means, said electrical circuit means including at least one magnetically actuatable switch, said switch being fixed in a position whereby it is actuated only upon emplacement of said symbol bearing means on said display board in the correct predetermined correspondence with said logic means;

an electrically actuated signal device connected in said electrical circuit means;

power supply means connected in said electrical circuit means and adapted to actuate said signal device upon said electrical circuit becoming conductive.

3. The learning feedback device according to claim 2 in which said symbol bearing means, logic means, and said electrical circuit means are substantially flat with said logic means contiguous to both said symbol bearing means and said electrical circuit means when properly emplaced for energization of said electrical circuit means.

4. The learning feedback device according to claim 2 in which said electrical circuit means includes a plurality of magnetically actuatable switches whereby multiple predetermined correct symbol means and logic means bearing indicia combinations will close said electrical circuit means.

5. The learning feedback device according to claim 4 in which said logic means includes a plurality of cards made of plastic or other non-magnetic material, said cards having cutouts at various locations so that a symbol bearing means emplaced in a cutout will, in a predetermined manner determined by both the location of the magnet in said symbol bearing means and the location of the magnetically acutated switch in said electrical circuit means, close said electrical circuit means while remaining electrically isolated therefrom.

6. The learning feedback device according to claim 5 in which said cards contain a plurality of cutouts, each adapted to receive a symbol bearing means having at least one magnet therein, with said electrical circuit means being adapted to be closed upon predetermined combinations of two or more symbol bearing means being emplaced in the cutouts in said indicia bearing cards.

7. The learning feedback device according to claim 6 in which said magnetic swtiches are responsive to the axial orientation of said magnets whereby a large number of predetermined correct emplacements of a single symbol bearing means including a plurality of magnets is attained.

8. A learning feedback device comprising:

a display board adapted to receive one or more symbol bearing means on a surface thereof;

at least one symbol bearing means sized for emplacement on said display board, said symbol bearing means including at least one magnet;

said display board having a predetermined location thereupon for emplacement of a symbol bearing means thereupon;

electrical circuit means electrically isolated from said symbol bearing means, said electrical circuit means including at least one magnetically actuatable switch, said switch being fixed in a position whereby it is actuated only upon emplacement of said symbol bearing means on said display board in the correct predetermined correspondence therewith;

an electrically actuated signal device connected in said electrical circuit means;

power supply means connected in said electrical circuit means and adapted to actuate said signal device upon said electrical circuit means becoming conductive.

9. A learning feedback device according to claim 8 in which said electrical circuit means includes a plurality of said magnetically actuatable switches adapted to close said circuit only upon a predetermined correct placement of two or more symbol bearing means on said display board.

10. The learning feedback device according to claim 8 in which the location of a magnet included in said symbol bearing means is variable whereby multiple predetermined correct relationships with a given location of a plurality of magnetic switches can be attained.

11. A learning feedback device comprising:

a display board adapted to receive logic means and one or more symbol bearing means on the surface thereof;

at least one symbol bearing means sized for emplacement on said display board, said symbol bearing means including at least one magnet;

said logic means disposed on the surface of said display board in electrically non-contacting relationship with said symbol bearing means, said logic means including at least one magnet;

electrical circuit means having at least first and second magnetically actuatable switches adapted to become electrically conductive upon a predetermined correct emplacement of said symbol bearing means in relation to said logic means so that said magnet of said symbol bearing means actuates said first switch and said magnet of said logic means actuates said second switch;

an electrically actuated signal device connected in said electrical circuit means;

and power supply means connected in said electrical circuit means and adapted to actuate said signal device upon both said first and second switches of said electrical circuit means becoming conductive.

* * * * *